United States Patent [19]

Yung-Huei

[11] Patent Number: 5,076,527

[45] Date of Patent: Dec. 31, 1991

[54] SUCKING ON DEVICE WHICH IS EASILY TO BE LIFTED BUT IS NOT EASILY GETTING OVERTURNED

[76] Inventor: Lan Yung-Huei, 3F No. 32 Lane 61 Sec. 2 Hang-Chuo S. Rd., Taipei, Taiwan

[21] Appl. No.: 580,188

[22] Filed: Sep. 10, 1990

[51] Int. Cl.⁵ ............................................. A45D 42/14
[52] U.S. Cl. .................................. 248/362; 248/205.5; 248/363
[58] Field of Search ............ 248/362, 683, 363, 205.5, 248/205.6, 205.7, 205.8, 205.9

[56] References Cited

U.S. PATENT DOCUMENTS

| | | | |
|---|---|---|---|
| 3,159,370 | 12/1964 | Rubenstein | 248/362 X |
| 3,675,886 | 7/1972 | Kampmier | 248/363 |
| 4,180,229 | 12/1979 | Schulein | 248/363 |
| 4,221,356 | 9/1980 | Fortune | 248/363 |
| 4,756,497 | 7/1988 | Lan | 248/205.9 |
| 4,957,318 | 9/1990 | Blatt | 248/205.9 X |

FOREIGN PATENT DOCUMENTS 0182070  1/1963  Sweden ........................ 248/205.8

*Primary Examiner*—Ramon O. Ramirez

[57] ABSTRACT

An apparatus for releasably securing an article on a flat surface. The article is supported at its bottom surface by a first upper supporting surface of a supporting plate; that has at least one first through hole, and a blocking portion in a first lower surface. A vacuum sucker is provided for releasably attaching to the flat surface and is provided with a second through hole on a second lower surface and being adapted to be blocked by the blocking portion of the supporting plate. At least one telescopic guiding assembly including a spindle secured at a first lower end to the second upper supporting surface of the sucker body and having an upper portion which extends upwardly from the first lower end through the first hole beyond the first upper supporting surface of the supporting plate, and an outer tube secured at a second lower end thereof to the first upper supporting surface of the supporting plate around the first through hole and extending upwardly from the second lower end thereof to surround the upper portion of the spindle extending beyond the first upper supporting surface. The spindle telescopically moves in and relative to the first through hole and the outer tube by a force in an upright direction.

9 Claims, 3 Drawing Sheets

SUCKING ON DEVICE WHICH IS EASILY TO BE LIFTED BUT IS NOT EASILY GETTING OVERTURNED

BACKGROUND OF THE INVENTION

The common articles which have been placed on a flat and smooth surface, if they have been fixed on the surface, will be placed in their position firmly but will not be easily lifted. Very few ideal structures are available on which an article can be placed firmly but at the same time allow the user to easily retrieve the article and place it on another surface. Articles, such as desk lamps, manual pencil sharpeners, manual ice crushers, manual icecream mixers, desk stationary boxes, vases, table decorations etc., all have to be placed firmly but at the same time must be easily retrieved.

In view of the above, the present invention offers a base device, which is not easily overturned and may be easily lifted up. With such a base device, articles can be placed on any flat and smooth surface and sucked onto it firmly but these will still be easily lifted up.

The relevant prior art to the present invention is U.S. Pat. No. 4,756,497.

SUMMARY OF THE INVENTION

The present invention relates generally to a suck-on device, which can be placed at the bottom of an article on a flat and smooth surface at random so that the article may stick to the surface and not be easily overturned while allowing at the same time for the article to be easily lifted up. This device can be used for a desk lamp, a stationary box, a vase, an ornament, a manual pencil sharpener, a manual ice crusher, a manual icecream mixer and the like, which must be seated firmly in their place while being easily lifted up. If the above-mentioned manual-operated articles are equipped with the device of the present application, they not only will be seated firmly without necessity for hand support but can be conveniently operated with one hand.

This device of the present invention is provided with a sucking cup for serving tightly sucking-on purpose, and the sucking cup is provided with a through hole having a plug or cover which is able to close or open. Therefore, when the plug or cover has closed the through hole, the sucking cup can develop its vacuum sucking-on force. If the plug or cover has opened the through hole and allowed the air in, the sucking cup will lose its sucking-on force and release the sucked surface. In addition, a properly retractable mechanism is installed to serve as an interconnection between the supported article and the sucking cup and to control opening/closing of the plug or cover. This retractable mechanism can be a retractable tubular structure or linear guiding groove type structure, a guiding rail type structure, or a traditionally suitable reciprocative structure and may be mounted vertically so that it can move up and down. Two counterly retractable mechanism are respectively connected to the sucking cup on the bottom and the supported article on the top. For example, an outer tubular structure of the retractable tubular structure can be connected to the sucking cup firmly and an inner tubular structure of the retractable structure can be fixed to the supported article. The guiding groove structure may be a sliding block which can be fixed to the supported article, while the body of the guiding groove structure may be fixed to the sucking cup on the bottom. Therefore, the section between the supported article and the sucking cup can retract up and down. Furthermore, the plug or cover is driven by the section connected to the supported article or by the supported article directly (as mentioned above, if it is a retractable tubular structure, the plug or cover is driven by the supported article or the inner tubular structure; or if it is a guiding groove structure, the plug or cover is driven by the supported article or sliding block). Therefore, when the device of the present invention is placed on a flat and smooth surface, the retractable mechanism is pressed downwards to retract by the gravitational weight of the supported article. The plug or cover is driven to close the through hole. The sucking cup thus suctorially attaches to the surface. When the supported article is vertically lifted, the retractable mechanism will be pulled in extension jointly. When the supported article is lifted up to a predetermined distance, the plug or cover is driven to open the through hole to let air flow into the sucking cup and so the supported article will be easily lifted up away from the surface.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1:
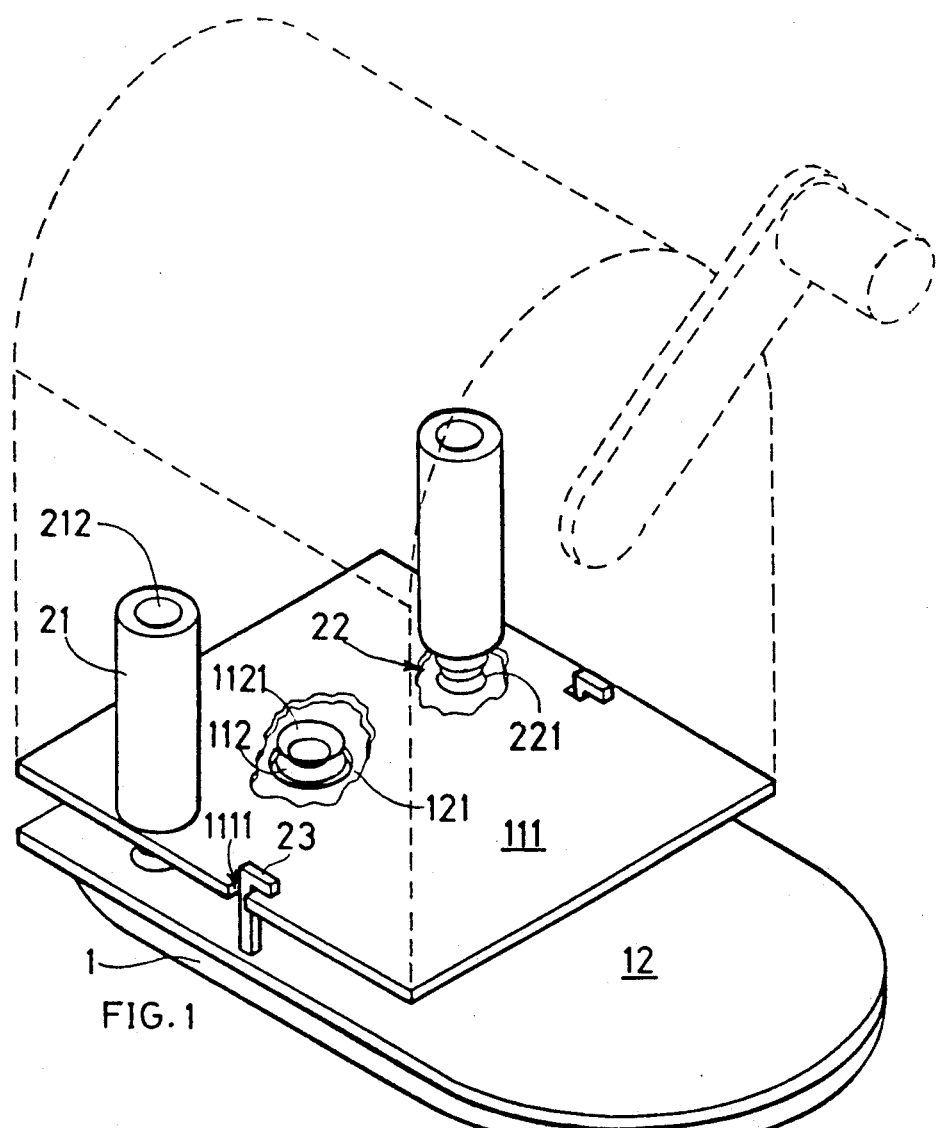
FIG. 1 is a perspective view for the first example of a preferred embodiment of the present invention.

Two examples of embodiments are used for the explanation of the present invention. In the first example, shown in FIGS. 1 and 2, the device of the present invention comprises a sucking cup 1 provided with a through hole 11, a plate 111 located above the through hole 11. On the one hand, the plate 111 may be utilized as the cover of the through hole 11, and on the other hand, it may be utilized as the base plate of the article to be supported (for example, the article shown by dotted lines in the figure is a manual pencil sharpener, and the body of this pencil sharpener is fixed on the base plate). In order to make the plate 111 provide a better sealing effect to the through hole 11 and maintain the through 11 closed even if the plate 11 is moved up and down to a certain distance or tilted and swung to a certain extent, a flexible retractable tubular structure 112 is therefore installed above the through hole 11. A funnel shaped mouth 1121 which can be closely sealed to the plate 111 is installed on the upper side of the retractable tubular structure 112. Therefore, the plate 111 can actually close the through hole 11 when the plate 111 moves within a certain range.

Figure 2:
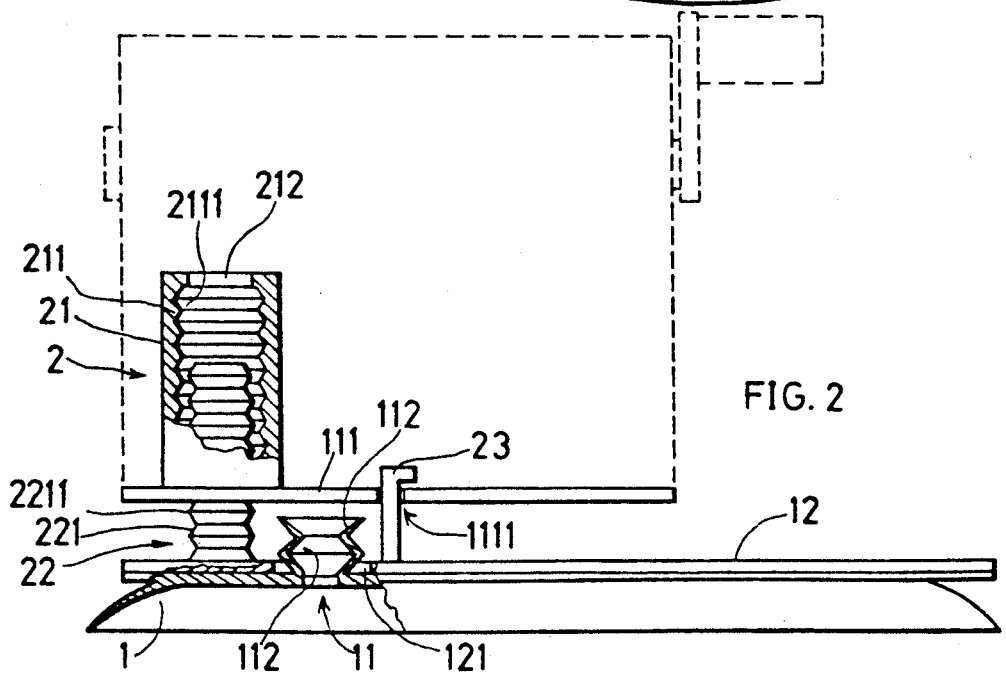
FIG. 2 is a partially cut away front side view for the first example of the preferred embodiment of the present invention.

So as to make the article fixed on its place but at the same time be able to be easily lifted, in the first example of the embodiments, two retractable tubular units 2 each of which comprises an upper tubular structure 21 and a lower tubular structure 22 are installed. The upper tubular structure 21 is connected to the plate 111 (or it may be connected to the article directly) and the lower tubular structure 22 is connected to a back plate 12 of the sucking cup 1. Because the movement of these two retractable tubular units is limited to upward and downward retraction and the back plate 12 of the sucking cup 1 is connected to the sucking cup 1 as a whole structural body (as shown in FIG. 2, the back plate 12 is glued to the sucking cup, but other methods which provide firm connection can also be utilized), the section between the sucking cup 1 and the article is limited to upward and downward movement and other movements such as swinging and tilting can all be prevented. In addition, a venting hole 212 is located on the upper tubular structure for eliminating air drag, when the retractable tubular units are placed on a flat and smooth surface to retract. The sucking cup will be attached to the surface firmly and the article will seat firmly to resist all lateral movement. Only when the article is lifted up, the retractable tubular units 2 will extend in length and the plate 111 will be moved upwards accordingly, and not until the article has been moved to a certain distance. The funnel shaped mouth 1121 will separate from the plate 111 which releases the vacuum of the sucking cup 1. When the retractable tubular units extends a little further in length, a hook 23 located on the back plate 12 of the sucking cup 1 will hook on the side edge of the opening 1111 on the plate 111 to let the retractable tubular units stopping any further extention and the sucking cup on the bottom will be lifted up together with the article.

Upper tubular structures 21 having smooth inner surfaces and lower tubular structures 22 having smooth outer surfaces can be utilized under a circumstance in which no very violent swinging, tilting and jumping movements will be experienced. So as to allow the retractable tubular units to function better, the internal surface of the upper tubular structure 21 and the external surface of the lower tubular structure 22 can be provided with respective circular dents 211 and projections 221. The diameter of each of projections 2111 on the internal surface of the upper tubular structure 21 is slightly larger than the diameter of each of projections 2211 on the external surface of the lower tubular structure 22. Therefore, when the tubular units are vertically pulled upward and downward or pressed down, their respective projections 2111 and 2211 will not jam each other because of the dent and projections being very shallow so that the tubular units are still allowed to retract. But when a swinging or lateral force is applied to the tubular units, the dents and projections 211 and 221 will engage each other to provide additional resisting force to the extension of the tubular units. Therefore, this is more effective than the upper and lower tubular structures having completely smooth surfaces.

A hole 121 on the back plate 12 of the sucking cup allows the retractable tubular structure 112 to pass through without disturbing its movement.

Figure 3:
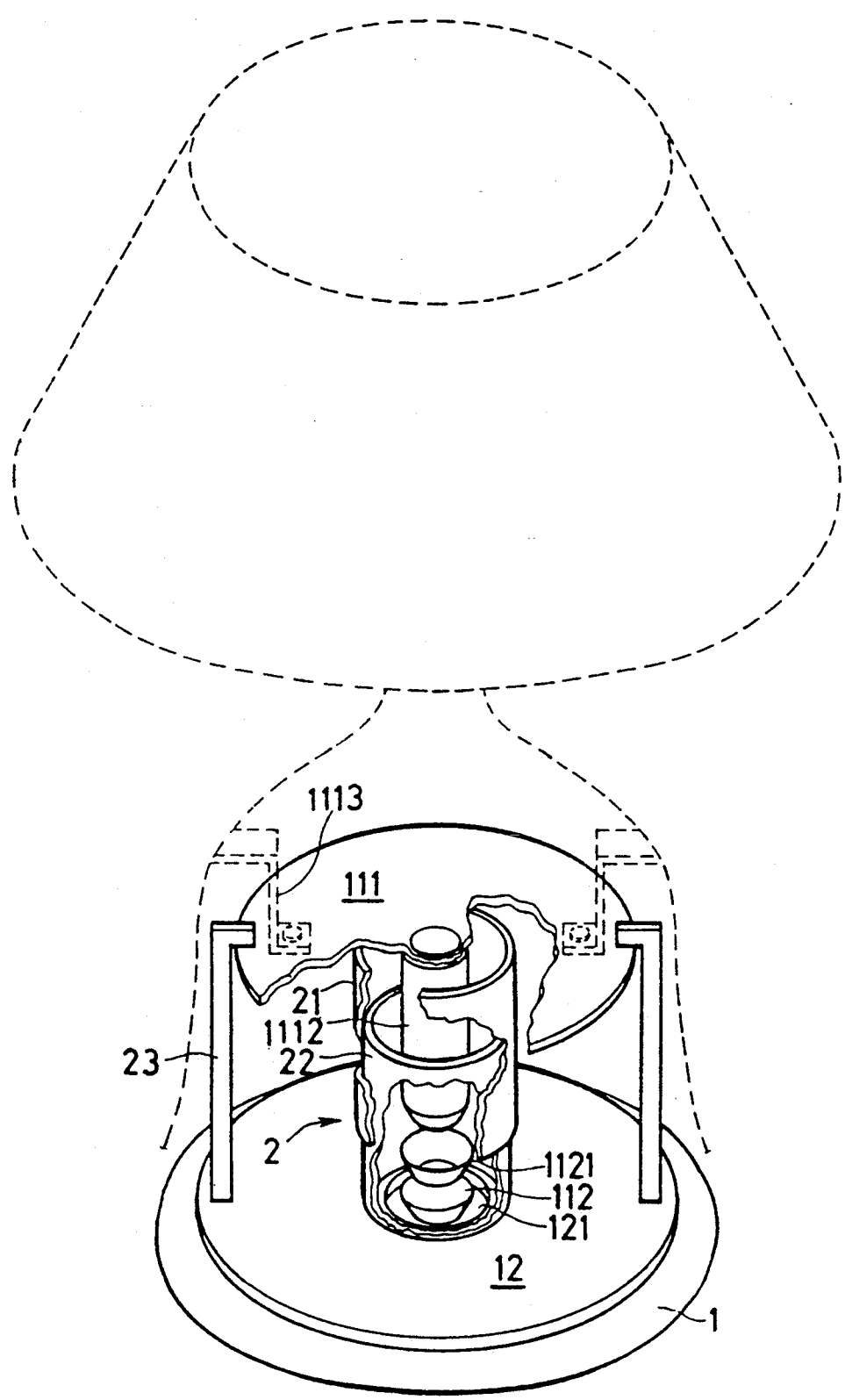
FIG. 3 is a perspective view for the second example of the preferred embodiment of the present invention.
Figure 4:
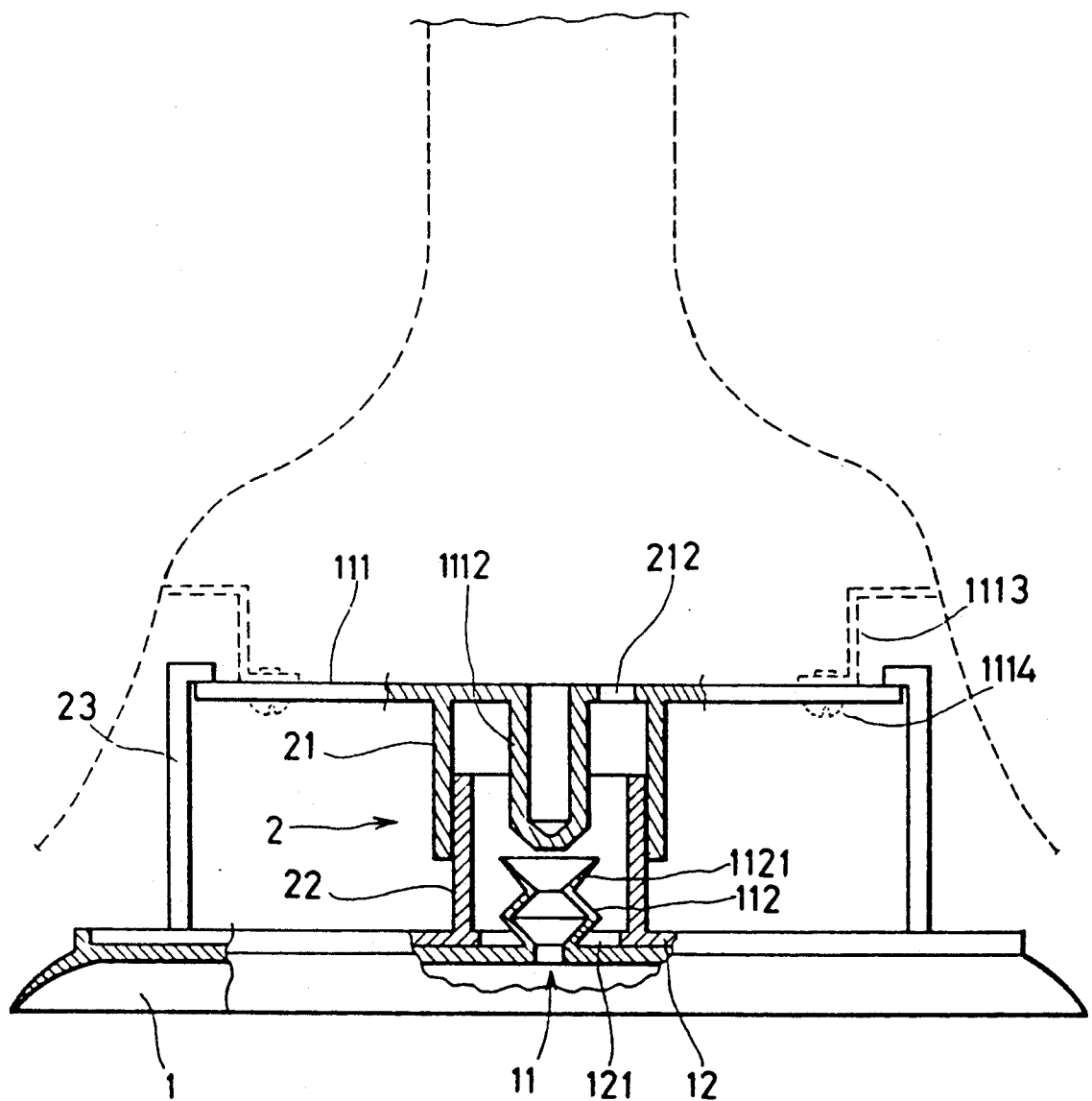
FIG. 4 is a partially cut away front side view for the second example of the preferred embodiment of the present invention.

Based upon the use, if the device of the present invention is applied to articles, such as desk lamps, stationary storage boxes and so on, which are seldom required to be lifted up or placed down or pushed by accident, some modifications, omissions, changes in arrangement can be made depending upon practical situation requirement, in order to provide a cheaper and simpler device which is, however, still effective enough to hold an article firmly on a flat surface. FIGS. 3 and 4 of the present application have shown such a construction which constitutes the second example of embodiments of the present invention. As described above and shown in FIGS. 1 and 2, the first example of embodiments of the present invention possesses two retractable tubular units, an eliptical sucking cup, a through hole 11 which is located between those two retractable tubular units in the eliptical sucking cup, and a plate 111 which is connected to the lower end of the upper tubular structure 21 and is utilized as a cover for closing the through hole 11 by its corresponding portion. The second example of embodiments of the present invention possesses, as shown in FIG. 3, only one retractable tubular unit comprising an upper tubular structure 21, which has a smooth inner surface, and a lower tubular structure 22 which has a smooth outer surface. No dent and projection 211 and 221 are provided in the second example. In addition, the sucking cup is changed into a circular shape, and the location of the through hole 11 is moved into the lower tubular structure 22. In yet another embodiment, the plate 111 is connected to the upper rim of uper tubular structure 21 and has portions thereof above the hole 11 being formed into a downward projection which is utilized as a plug 1112 for closing the thorugh hole 11.

Now, FIGS. 3 and 4 will be explained in details. The sucking cup 1 is connected to the lower side of the back plate 12, while its central portion is provided with a through hole 11. A flexible retractable tubular structure 112 is connected above the hole 11 and extends upwardly after passing through the through hole 11 of the back plate 12. The top side of the flexible retractable tubular structure 112 is provided with a funnel shaped mouth 1121 which can be closed by the plug 1112 of the plate 111. The retractable tubular unit 2 is located in the central portion of the present invention, and the through hole 11 is located inside the lower tubular structure 22. The upper tubular structure 21 is telescoped on the lower tubular structure 22, with the upper tubular structure 21 being retractable up and down. In addition, a venting hole 212 (FIG. 4) is provided above the upper tubular structure 21 so as to eliminate air drag when the tubular unit is retracting. The top side of the upper tubular structure 21 is connected to the plate 111 while the plate 111 is connected to the article (for example, a desk lamp as shown by the dotted lines in FIG. 4 can be connected by connecting plates 1113 and screws 1114; vases, ornaments and the like can be connected to the plate 111 by a similar method). When the device of the present invention is placed on a table, the retractable tubular unit 2 will be urged to retract due to the weight of the article. The plug 1112 will be inserted into the funnel shaped mouth 1121 to close the through hole 11. At the same time, the plug 1112 will compress the flexible retractable tubular structure 112. At this moment, the sucking cup 1 will stick onto the flat and smooth surface firmly so as to prevent the article from being tilted over or overturned. When the article is vertically lifted up, the retractable tubular unit 2 will be extended in length and the flexible retractable tubular structure 112 will also be extended in length. When the flexible retractable tubular structure 112 has extended to its extension limit and stopped extending, the plug 1112 will separate from the funnel shaped mouth 1121 so as to allow air to flow into the sucking cup 1 via the through hole 11 to release the sucking cup. When the retractable tubular unit 2 continues extending upwards to cause the plate 111 to engage the hook 23, if the article continues to be lifted upwards, the sucking cup will be lifted up accordingly.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

I claim:

1. An apparatus for releasably securing an article having a bottom surface on a flat surface, comprising:

a supporting plate for the article, having a first upper supporting surface, a first lower surface, and at least one first through hole, said first upper supporting surface being adapted to be attached to the bottom surface of the article for supporting the article thereon, said first lower surface having a blocking portion;

vacuum sucking means for releasably attaching to the flat surface, including a sucker body having a second upper supporting surface and a second lower surface, said sucker body being provided with a second through hole which extends through the thickness of said sucker body from said second lower surface to said second upper supporting surface and is adapted to be blocked by said blocking portion of said first lower surface of said supporting plate; and at least one telescopic guiding assembly, including a spindle and an outer tube, said spindle being secured at a first lower end thereof to said second upper supporting surface of said sucker body and having an upper portion which extends upwardly from said first lower end thereof through said first through hole beyond said first upper supporting surface of said supporting plate, said outer tube being secured at a second lower end thereof to said first upper supporting surface of said supporting plate around said first thorugh hole and extending upwardly from said second lower end thereof to surround said upper portion of said spindle extending beyond said first upper supporting surface, said spindle having a diameter slightly smaller than the inner diameter of said first through hole and than the inner diameter of said outer tube so that said spindle is permitted to be driven to telescopically move in and relative to said first through hole and said outer tube by a force in an upright direction;

whereby, when said apparatus is located upon the flat surface with the article being securely attached on said first upper supporting surface of said supporting plate, the weight of the article will force said supporting plate to move downwardly to allow said blocking portion of said first lower surface of said supporting plate to block said second through hole of said sucker body with substantially all of the length of said spindle being telescopically inserted into said outer tube, so that said sucker body may suctorially secure to the flat surface under the pressure created by the weight of the article; and when the article is upwardly lifted up, said supporting plate is also lifted up to allow said blocking portion to disengage said second through hole so that the suctorial force of said sucker body is removed.

2. An apparatus as claimed in claim 1, wherein said spindle having an outer wall which has a first wavy section, and said outer tube having an inner wall which has a second wavy section, with the smallest inner diameter of said outer tube being slightly larger than the largest outer diameter of said spindle, so that said spindle is allowed to be driven to telescopically and smoothly move with respect to said outer tube by a force in the upright direction, but will be difficult to be driven to move with respect to said outer tube by a force in a sidewise direction.

3. An apparatus as claimed in claim 1, further comprising a supporting plate limiting assembly including at least one hook element having a post portion and a tab portion, said post portion, being secured at a lower end thereof to said second upper supporting surface of said sucker body and extending upwardly from said lower end thereof to a predetermined level to form an upper end, said blocking portion of said supporting plate being disengaged from said second through hole of said sucker body when said supporting plate is at said predetermined level, said tab extending at an angle generally normal to the axis of said post from said upper end of said post portion to a position which is substantially above said first upper supporting surface so that when said supporting plate is lifted upwardly with an upward lifting movement of the article to reach said predetermined level, said first upper supporting surface will be engaged by said tab portion so that said supporting plate is prevented from being moved further away from said sucker body and a further upward lifting movement of said supporting plate will also lift up said sucker body.

4. An apparatus as claimed in claim 1, further comprising a retractable tube integrally formed with said sucker body and extending upwardly beyond said second upper supporting surface from a portion of said sucker body surrounding said second through hole, said retractable tube having a central through hole communicating with said second through hole and having an upper end opening which is formed to be adapted to be sealingly covered by said blocking portion of said supporting plate; whereby the weight of the article loaded by said supporting plate of said apparatus located upon the flat surface will force said supporting plate to move downwardly to allow said blocking portion of said first lower surface of said supporting plate to sealingly cover said upper end opening of said retractable tube, and when the article is upwardly lifted up, said supporting plate is also lifted up to allow said blocking portion to disengage said upper end opening of said retractable tube so that the suctorial force of said sucker body is removed.

5. An apparatus as claimed in claim 4, wherein said retractable tube is formed in the type of a bellows pipe.

6. An apparatus for releasably securing an article having a bottom surface on a flat surface, comprising:

a supporting plate for the article, having a first upper supporting surface, a first lower surface, a plug member located centrally on said first lower surface and extending downwardly from said first lower surface, an outer guiding tube extending downwardly from said first lower surface and surrounding said plug member, and a first through hole disposed in the area of said supporting plate between said plug member and said outer guiding tube, said first upper supporting surface being adapted to be attached to said bottom surface of the article for supporting the article thereon, said plug member having a blocking portion at a lower distal end thereof; and vacuum sucking means for releasably attaching to the flat surface, including a sucker body having a second upper supporting surface, a second through hole disposed centrally of said sucker body and formed to be adapted to be blocked by said blocking portion of said plug member when said apparatus is located upon the flat surface and the article is loaded by said supporting surface, and an inner guiding tube extending upwardly from said second upper supporting surface and surrounding said second through hole, both of the inner diameters of said outer and inner guiding tubes being larger than the peripheral dimension of said plug member, the outer diameter of said inner guiding tube being substantially equal to the inner diameter of said outer guiding tube so that said inner guiding tube may be telescopically inserted into said outer guiding tube with said plug member inserting into the interior of said inner guiding tube to prepare to block said second through hole and with said first and second through holes achieving therebetween an atmospheric communication which will be shut off by said blocking portion of said plug member when the weight of the article is enabled to be applied to said supporting plate which then moves downwardly to allow said blocking portion of said plug member to sealingly block said second through hole with substantially all of the length of said inner guiding tube inserting into said outer guiding tube;

whereby, when said apparatus is located upon the flat surface with the article being securely attached on said first upper supporting surface of said supporting plate, the weight of the article will force said supporting plate to move downwardly to allow said blocking portion of said plug member to sealingly block said second through hole of said sucker body with substantially all of the length of said inner guiding tube being telescopically inserted into said outer guiding tube, so that said sucker body may suctorially secure to the flat surface under the pressure created by the weight of the article; and when the article is upwardly lifted up, said supporting plate is also lifted up to allow said blocking portion to disengage said second through hole so that said second through hole is in communication with the atmosphere through said first through hole so that the suctorial force of said sucker body is removed.

7. An apparatus as claimed in claim 6, further comprising a supporting plate limiting assembly including at least one hook element having a post portion and a tab portion, said post portion being secured at a lower end thereof to said second upper supporting surface of said sucker body and extending upwardly from said lower end thereof to a predetermined level to form an upper end, said blocking portion of said plug member being disengaged from said second through hole of said sucker body when said supporting plate is at said predetermined level, said tab extending at an angle generally normal to the axis of said post from said upper end of said post portion to a position which is substantially above said first upper supporting surface so that when said supporting plate is lifted upwardly with an upward lifting movement of the article to reach said predetermined level, said first upper supporting surface will be engaged by said tab portion so that said supporting plate is prevented from being moved further away from said sucker body and a further upward lifting movement of said supporting plate will also lift up said sucker body.

8. An apparatus as claimed in claim 6, further comprising a retractable tube integrally formed with said sucker body and extending upwardly beyond said second upper supporting surface from a portion of said sucker body surrounding said second through hole, said retractable tube having a central through hole communicating with said second through hole and having an upper end opening which is formed to be adapted to be sealingly covered by said blocking portion of said plug member; whereby the weight of the article loaded by said supporting plate of said apparatus located upon the flat surface will force said supporting plate to move downwardly to allow said blocking portion of said plug member to sealingly cover said upper end opening of said retractable tube, and when the article is upwardly lifted up, said supporting plate is also lifted up to allow said blocking portion to disengage said upper end opening of said retractable tube so that tube so that the suctorial force of said sucker body is removed.

9. An apparatus as claimed in claim 8, wherein said retractable tube is formed in the type of a bellows pipe.

* * * * *